US010116660B2

(12) United States Patent
Chasman et al.

(10) Patent No.: US 10,116,660 B2
(45) Date of Patent: Oct. 30, 2018

(54) SECURITY MODES FOR A COMPONENT-BASED WEB SECURITY MODEL

(71) Applicant: salesforce.com, inc., San Francisco, CA (US)

(72) Inventors: Doug Chasman, Pittsford, NY (US); Caridy Patiño, Miami, FL (US); Trevor James Bliss, Oakland, CA (US); Sergey Gorbaty, Emeryville, CA (US)

(73) Assignee: salesforce.com, inc., San Francisco, CA (US)

( * ) Notice: Subject to any disclaimer, the term of this patent is extended or adjusted under 35 U.S.C. 154(b) by 113 days.

(21) Appl. No.: 15/364,929

(22) Filed: Nov. 30, 2016

(65) Prior Publication Data

US 2018/0152456 A1 May 31, 2018

(51) Int. Cl.
*H04L 29/06* (2006.01)

(52) U.S. Cl.
CPC .......... *H04L 63/101* (2013.01); *H04L 63/06* (2013.01)

(58) Field of Classification Search
CPC ....... H04L 63/20; H04L 63/06; H04L 63/101; G06F 21/10
USPC ................................................ 726/1, 26–30
See application file for complete search history.

(56) References Cited

U.S. PATENT DOCUMENTS

| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |

(Continued)

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

(Continued)

*Primary Examiner* — Hosuk Song
(74) *Attorney, Agent, or Firm* — Weaver Austin Villeneuve & Sampson LLP

(57) ABSTRACT

Disclosed are examples of systems, apparatus, methods and computer program products for providing a security model for component-based web applications. Documents for a web-based application are received, with the application containing custom components and Application Programming Interface (API) components. A Document Object Model (DOM) is processed corresponding to the web-based application, with the components modeled in hierarchical form. Each API component is assigned to a system mode setting, where the system mode setting is configured to provide the API component access to all of the components in the application. One or more secure documents are generated for each custom component, with each secure document containing a key in accordance with the rules of capability security. Each custom component is then assigned to a user mode setting, where the user mode setting is configured to provide custom components access to other components in the application for which a key can be provided.

20 Claims, 13 Drawing Sheets

(56) References Cited

U.S. PATENT DOCUMENTS

| | | |
|---|---|---|
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,741,242 B1 * | 5/2004 | Itoh ................ G06F 17/30896 345/419 |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,546,602 B2 * | 6/2009 | Hejlsberg ................ G06F 9/54 717/114 |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zuckerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,346,929 B1 * | 1/2013 | Lai ................ G06Q 10/10 709/226 |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,566,792 B2 | 10/2013 | Chasman et al. |
| 8,646,103 B2 | 2/2014 | Jakobson et al. |
| 8,914,438 B2 | 12/2014 | Pletter et al. |
| 9,021,435 B2 | 4/2015 | Pletter et al. |
| 9,098,618 B2 | 8/2015 | Chasman et al. |
| 9,129,088 B1 * | 9/2015 | Baschy ................ G06F 21/10 |
| 9,426,249 B2 | 8/2016 | Chasman et al. |
| 9,485,234 B1 * | 11/2016 | Roth ................ H04L 63/20 |
| 9,692,787 B1 * | 6/2017 | Warner ................ H04L 63/20 |
| 9,830,470 B2 * | 11/2017 | Kerschbaum ....... G06F 21/6227 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |

(56) References Cited

U.S. PATENT DOCUMENTS

| | | |
|---|---|---|
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2008/0301766 A1 | 12/2008 | Makino et al. |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2009/0265760 A1 | 10/2009 | Zhu et al. |
| 2009/0328137 A1 | 12/2009 | Liang et al. |
| 2011/0218958 A1 | 9/2011 | Warshavsky et al. |
| 2011/0247051 A1 | 10/2011 | Bulumulla et al. |
| 2011/0289140 A1 | 11/2011 | Pletter et al. |
| 2011/0289141 A1 | 11/2011 | Pletter et al. |
| 2011/0289425 A1 | 11/2011 | Pletter et al. |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0039999 A1 | 2/2015 | Chasman et al. |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |
| 2015/0199080 A1 | 7/2015 | Pletter et al. |
| 2018/0075250 A1 | 3/2018 | Chasman et al. |
| 2018/0152450 A1 | 5/2018 | Chasman et al. |

OTHER PUBLICATIONS

U.S. Appl. No. 15/264,091, filed Sep. 13, 2016, Chasman et al.
U.S. Office Action dated Jul. 3, 2018 issued in U.S. Appl. No. 15/364,939.
U.S. Notice of Allowance dated Aug. 29, 2018 issued in U.S. Appl. No. 15/364,939.

* cited by examiner

SECURITY MODES FOR A COMPONENT-BASED WEB SECURITY MODEL

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

This patent document generally relates to web security, and more specifically to providing security modes for a component-based web security model.

BACKGROUND

"Cloud computing" services provide shared resources, applications, and information to computers and other devices upon request. In cloud computing environments, services can be provided by one or more servers accessible over the Internet rather than installing software locally on in-house computer systems. As such, users having a variety of roles can interact with cloud computing services.

BRIEF DESCRIPTION OF THE DRAWINGS

The included drawings are for illustrative purposes and serve only to provide examples of possible structures and operations for the disclosed inventive systems, apparatus, methods and computer program products for providing security modes for a component-based web security model. These drawings in no way limit any changes in form and detail that may be made by one skilled in the art without departing from the spirit and scope of the disclosed implementations.

DETAILED DESCRIPTION

Figure 1:
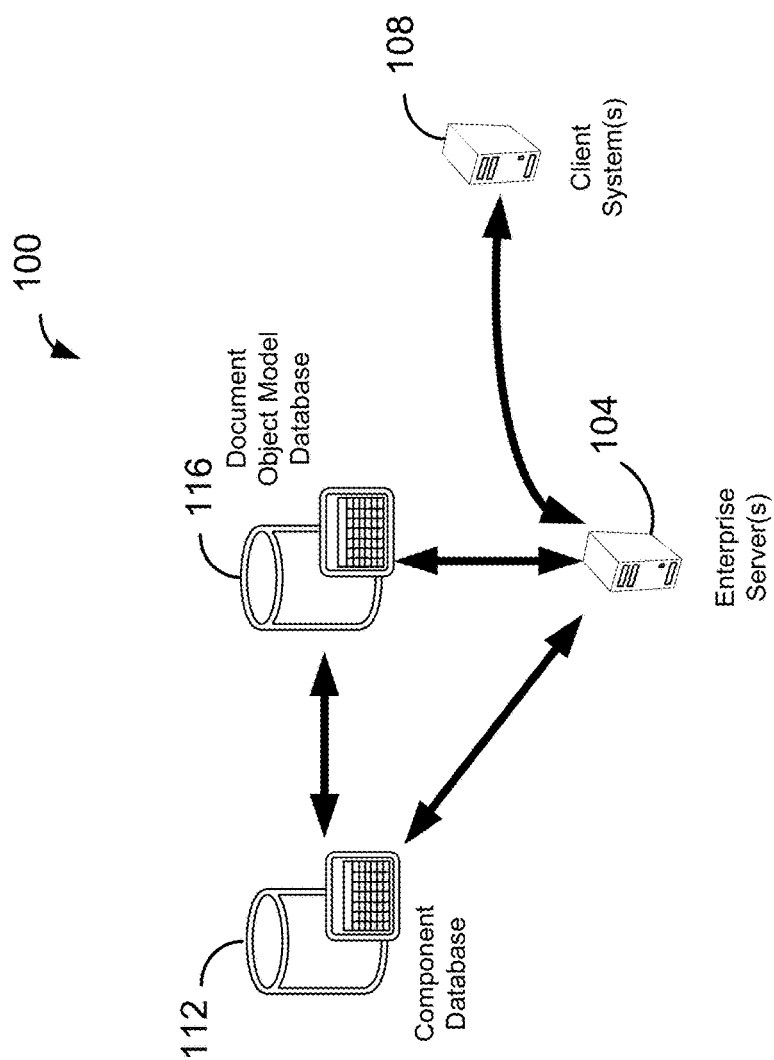
FIG. 1 shows a system diagram of an example of a system 100 for providing a security model for component-based web applications, in accordance with some implementations.

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

Some implementations of the disclosed systems, apparatus, methods and computer program products are configured for providing security modes for a component-based web security model.

One of the most important considerations in internet technology has been security. The nature of the internet has lent itself to many vulnerabilities, exploits, and attacks. These may be attacks on the web browser on the client side, or exploits based on web application code, on the server side. Cross-site scripting ("XSS") is an example of a major vulnerability on the server side. A web application may inadvertently leave itself open to an XSS exploit, allowing access of JavaScript code to someone else such as a malicious party. While the party may have no ability to change the code, it may be able to inject and execute malicious client-side scripts into the web page.

One of the conceptual areas of the internet in which security may be critical is the Document Object Model ("DOM"). A DOM is a programming interface for Hypertext Markup Language ("HTML") and Extensible Markup Language ("XML") documents. The DOM provides a structured, hierarchical representation of the document, and it defines the ways in which the structure can be accessed from programs so that they can change the document structure, style and content. The DOM provides a representation of the document as a structured group of nodes, objects, elements, and/or components that have properties and methods. The DOM essentially serves the purpose of connecting web pages to scripts or components.

Traditionally, standards bodies such as W3C have provided standardized DOMs that have been implemented in modern browsers. JavaScript code may utilize the DOM to access the document and its elements. Every element in the document, including the document as a whole, the head, tables, table headers, and text within table cells, is part of the DOM for that document. All of these elements can be accessed and manipulated using the DOM and a scripting language like JavaScript.

Component-based web applications have recently been popularized compared to single page applications. Web application components ("components") are small, reusable elements that can combine and interrelate to comprise a larger web application. Components are highly encapsulated, provide modular functionality, and ideally require no assumptions about the web containers or pages they run in. Component-centric applications are becoming a popular way to provide similar user experiences across a wide variety of devices, with little or no extra effort for any one platform or device.

One major security concern for component-based web applications relates to the lack of separation and encapsulation between these components in the web application. In a typical web application, there may be Application Programming Interface ("API") components for building applications that may be publicly documented and provided for developers to use in their applications. There may also be additional, private APIs that were necessary for applications to work, but were not publically documented. While best practices recommend developers to not use such private APIs, it was possible to access them in the DOM. In some instances, this can lead to the developer, and outside malicious parties, to have access to any part of the DOM, including global elements and variables. Custom components, such as widgets and other elements of a web application, may be able to scrape sensitive information or manipulate elements in various ways.

By way of illustration, Acme is a company with an internal web application for its employees. One aspect of the web application is an element that displays information on the company's relationship with a medical insurance provider, and displays a logged-in employee's account for that insurance provider. A separate element is a third-party widget that displays the current weather. Within the DOM for this application, the weather widget and the medical insurance element are on separate branches of the document structure, yet are able to access methods and variables from each other and from the top layer, the global document. Acme learns that the third-party weather widget had access to the private medical information of Acme's employees, because nothing was preventing the widget from scraping the private information from the DOM. Thus, in this scenario, merely including the weather widget within the web application introduces a vulnerability that compromised the privacy of Acme's employees.

Some of the disclosed techniques can be implemented to provide for a component-centric security model for web applications. This model provides for the secure encapsulation of DOM elements with fine-grained access control. A secure virtual DOM is implemented for each encapsulated element, such that developers may think they're working with actual components and the actual web document, but are really working with "secure objects" that have been compiled as proxies. The virtual DOM is secured by giving custom components access only to the secure elements and components that the developer has a "key" in physical memory for. Access is prohibited for private and undocumented API components, as well as components from other developers. In this way, best security practices may be enforced for developers, and the DOM can be protected from potential security problems, including scraping, XSS, spoofing, and other exploits.

Some of the disclosed techniques can be provided for implementing security modes within a component-centric security model. Public API components, such as browser components, within the model can run in a "system mode", similar to an operating system's system mode, in which the public components are provisioned full access to the real DOM, real documents, and real objects. Custom and private API components run in a "user mode" in which there is restricted access to the real DOM and real documents. These components are only given access to a secure virtual DOM. These secure custom and private components can make method calls to receive access to elements within other elements. Security components running in system mode can ensure that the elements are uniquely identified by the developer's key, which is stored in physical memory. In this way, system mode has full access to the real DOM and all components, and is capable of provisioning access of elements in various ways to custom components running in user mode.

Applying some implementations of the disclosed techniques, an alternative scenario to that described above is provided. In this alternative scenario, Acme has once again included employee medical information in a section of the web application, and has included a third party custom element for weather within the same section. A DOM is processed for the web application, wherein both the medical information component and the weather component are modeled in a hierarchical tree representing the web application. A key is assigned to each component, constituting an object reference of the component in physical memory, in accordance with the rules of capability security. For each component, one or more accessible components are then identified for which the component can provide a key. A virtual DOM is then generated for each component, wherein the component and the identified accessible components for that component are modeled in hierarchical form. Access is then restricted to all other, inaccessible components for that component. Since the third party weather widget and the medical component originated from different developers, they are given separate keys and are not identified as accessible to one another. The weather widget, therefore, has no ability to call functions of the medical element, nor scrape sensitive information from the element. The components are encapsulated, and thus Acme no longer has the problem of malicious components exploiting the vulnerabilities of an unsecured DOM.

In addition, Acme can make use of multiple security modes for components to facilitate the encapsulation and security of each component. Once the DOM is processed, each API component within the DOM—such as trusted components from authorized public APIs—is assigned to a "system mode" setting. The system mode setting is configured to provide the API component access to all of the components in the web-based application. One or more secure documents are then generated for each custom or third party component, with each secure document including a key in physical memory in accordance with the rules of capability security. Each custom component in the DOM is assigned to a "user mode" setting, wherein custom components are provided access only to other components for which the custom component can provide the key assigned to the other component. In some implementations, one of the API components is configured to determine whether custom components can provide the correct key to access other components. In this way, components can be assigned different levels of access for other components in the system in a way similar to how many operating systems can be run in system or administrative mode, or user mode.

In some but not all implementations, the disclosed methods, apparatus, systems, and computer-readable storage media may be configured or designed for use in a multi-tenant database environment or system.

The term "multi-tenant database system" can refer to those systems in which various elements of hardware and software of a database system may be shared by one or more customers. For example, a given application server may simultaneously process requests for a great number of customers, and a given database table may store rows of data such as feed items for a potentially much greater number of customers. The term "query plan" generally refers to one or more operations used to access information in a database system.

FIG. 1 shows a system diagram of an example of a system 100 for providing a security model for component-based web applications, in accordance with some implementations. System 100 includes a variety of different hardware and/or software components which are in communication with each other. In the non-limiting example of FIG. 1, system 100 includes at least one enterprise server 104, at least one client system 108, at least one component database 112, and at least one Document Object Model (DOM) database 116.

Component database 112 can allow for storage and retrieval of components within a web application. In some implementations, components may be retrieved from a remote server and stored in the component database 112. In some implementations, components in the component database 112 may include custom components, public API components, and private API components.

Document Object Model (DOM) Database 116 can allow for storage and retrieval of one or more Document Object Models for a web application. A DOM for a web application can be processed by the system 100, such that components of the web application can be modeled in a hierarchical form. In some implementations, the DOM Database 116 retrieves components from component database 112 in order to model them hierarchically. In some implementations, the DOM database 116 includes one or more virtual DOM representations for individual components in the web application.

Enterprise server 104 may communicate with other components of system 100. This communication may be facilitated through a combination of networks and interfaces. Enterprise server 104 may handle and process data requests from the client system 108. Likewise, enterprise server 104 may return a response to client system 108 after a data request has been processed. For example, enterprise server 104 may retrieve data from one or more databases, such as the component database 112 and the document object model database 116. It may combine some or all of the data from different databases, and send the processed data to client system 108.

Client system 108 may be a computing device capable of communicating via one or more data networks with a server. Examples of client system 108 include a desktop computer or portable electronic device such as a smartphone, a tablet, a laptop, a wearable device such as Google Glass®, another optical head-mounted display (OHMD) device, a smart watch, etc. Client system 108 includes at least one browser in which applications may be deployed.

Figure 2:
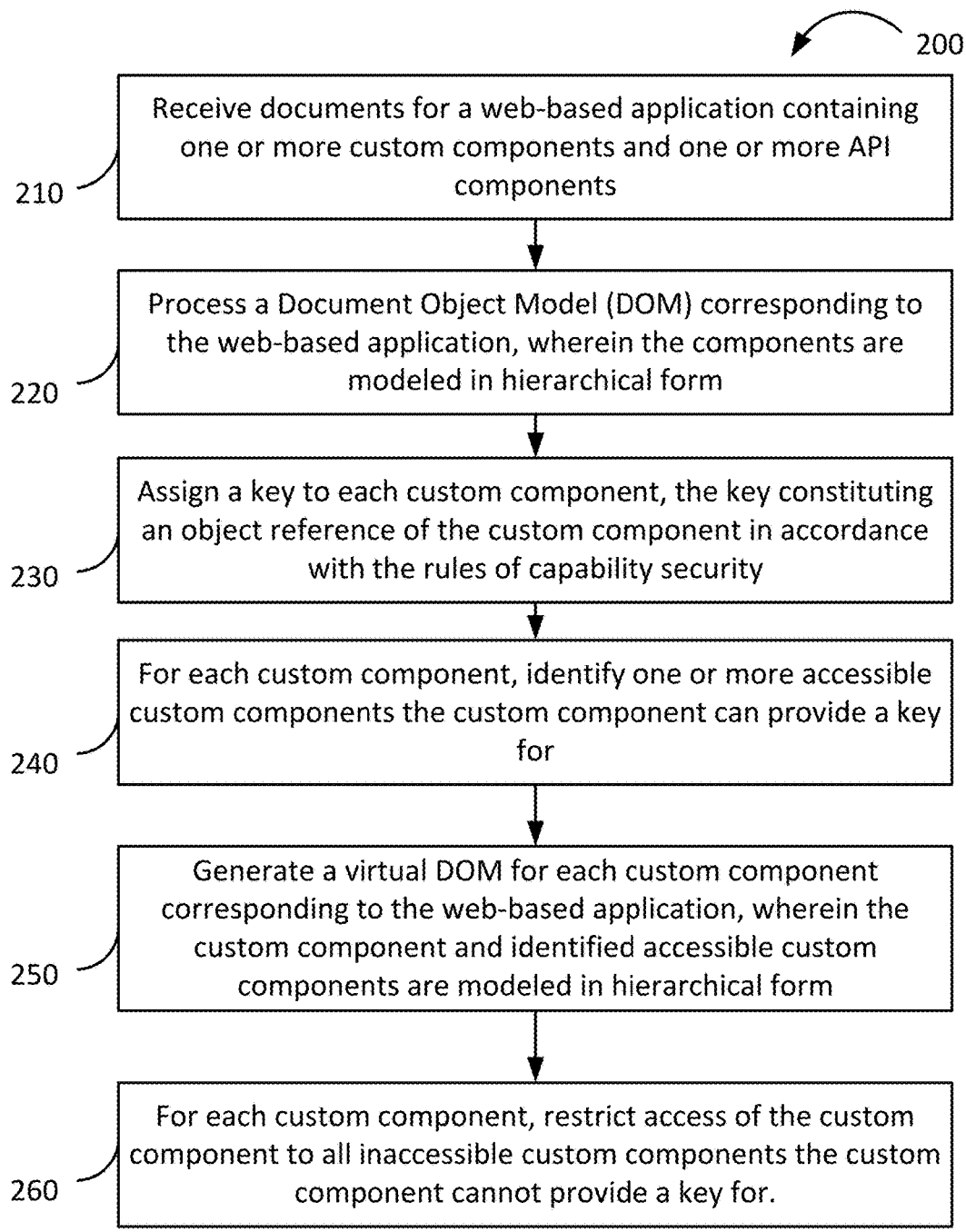
FIG. 2 shows a flowchart of an example of a method 200 for providing a security model for component-based web applications, performed in accordance with some implementations.

FIG. 2 shows a flowchart of an example of a method 200 for providing a security model for component-based web applications, performed in accordance with some implementations. Method 200 and other methods described herein may be implemented using system 100 of FIG. 1, although the implementations of such methods are not limited to system 100.

At block 210, system 100 receives documents for a web-based application containing one or more custom components and one or more API components. In some implementations, the documents are received through a browser at the client system 108. In some implementations, the documents may contain or relate to JavaScript, HTML, XML, or any other code or methods for generating web applications. For example, system 100, through a browser on client system 108, may receive documents from a remote server with JavaScript and HTML for generating a web application. Custom components may be components that are developed by a specific developer for use in the developer's application, or third-party components that are developed for use in the developer's application. In some implementations, API components may be publicly documented API components, or private, undocumented API components that are not intended to be accessible to custom components.

In some implementations, system 100 determines whether each API component is a private API component or a public API component. In some implementations, the determination is performed by analyzing a list of public API components and/or a list of private API components authorized by system 100. In some implementations, API components may contain metadata which identifies them as public API components or private API components.

In some implementations, system 100 assigns a "strict" mode to the documents in the web-based application. A strict mode, also known as "use strict", is a mode applied to JavaScript and potentially other web documents and code. In some implementations, in use strict mode, global objects cannot be accessed through the one or more components associated with the plurality of documents. In some implementations, strict mode prevents the value passed as "this" to provide components access to global variables and a global window. Instead, the function "this" returns an undefined, or null value. In this way, the ability to access the global elements of a DOM is prohibited.

In some implementations, system 100 assigns a content security policy to the documents in the web-based application, such that converting a string of code into executable code within the documents is prohibited. The content security policy removes both safe inlines and unsafe evals for JavaScript and other documents. With content security policy enforcement, it is no longer possible within a document to convert a string of code into executable code. Instead, a worker frame is generated that allows unsafe-inline, and uses dynamically created <script>code</script> tags to convert strings to executable code outside of the main runtime of the documents.

Figure 5A:
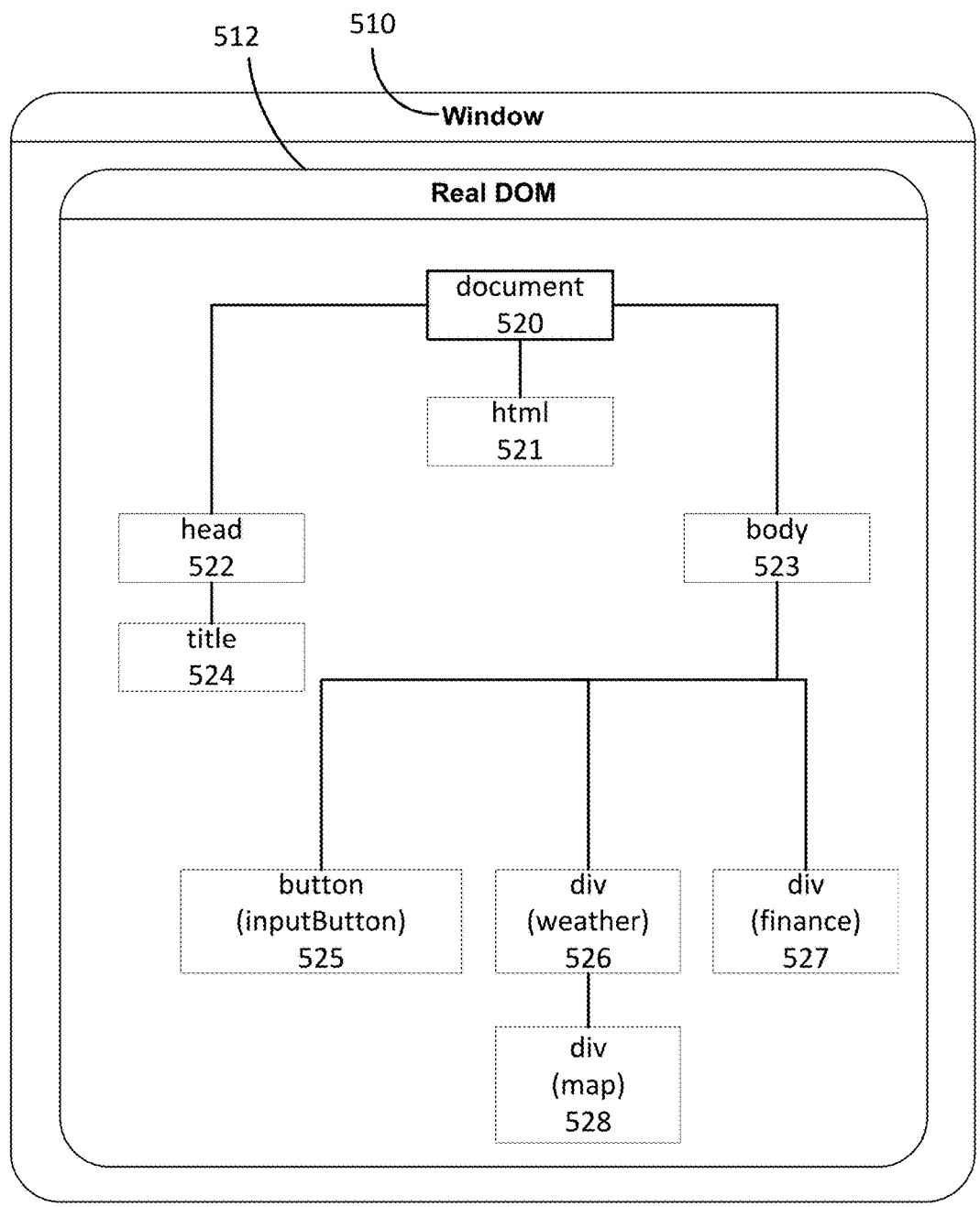
FIG. 5A is an example of a Document Object Model ("DOM") representing a component-based web application in a traditional security model, in accordance with some implementations.

At block 220, system 100 processes a DOM corresponding to the web-based application, wherein the components are modeled in hierarchical form, including the API components and custom components. In some implementations, system 100 is configured to generate a DOM for a web application based on the characteristics and dependencies of each component within the web application. An example of a DOM generated or processed for a web-application is illustrated in FIG. 5A, which will be described in further detail below.

At block 230, system 100 assigns a key to each custom component. The key constitutes an object reference of the custom component, in accordance with the rules of capability security. Capability security may also be known as a capability-based security model. Capability security is a security model used in the design of secure computing systems. A capability, hereinafter referred to as a "key", is a communicable, unforgeable token of authority. A key refers to a value that references an object along with an associated set of access rights. A key is needed in order to gain entry and access data and methods within components. In this way, a "key-based filtering" is applied to components within web applications. In some implementations, all objects within a DOM, as well as a DOM or virtual DOM, are either stamped with a key or not. In some implementations, non-keyed objects are only accessible with a "master key" that contains access rights for all objects. In some implementations, code within a custom component must possess or include the correct key to access any given object. In some implementations, methods within custom components also provide a key-based filtered view of all results sets. For example, invoking a findElementsByTagName("div") method may return only the <div> tags in the underlying document that were keyed with the calling component's key.

In some implementations, for each custom component, system 100 determines one or more namespace identifications for a developer associated with the custom component. Namespace identifications may be any identification for a given organization, company, developer, or any other party utilizing system 100 in any capacity. A namespace for one party may be different from another party.

In some implementations, keys are assigned to custom components based on the one or more namespace identifications of the developer associated with the custom component, and keyed components may be incompatible with one another based on the one or more namespace identifications. In some implementations, a namespace may be a company name. Any custom component within that specific namespace can provide the key for, and access, other custom components within the namespace. In some implementations, identification or associations other than namespace may be used to assign keys.

At block 240, for each custom component, system 100 identifies one or more accessible custom components the custom component can provide a key for. In some implementations, system 100 determines which custom components a custom component can provide a proper key for, and assigns an association between those custom components. In some implementations, the identification can be based on namespace or other identification or association method.

At block 250, system 100 generates a virtual DOM for each custom component corresponding to the web-based application. The custom component and identified accessible custom components are modeled in hierarchical form within the virtual DOM. In some implementations, public API components of the web application are modeled in hierarchical form as well. In some implementations, the virtual DOM may be modeled in the same way a standard DOM is modeled by system 100, but with components that cannot be accessed by that particular component blocked off, made invisible, or designated as inaccessible. Examples of virtual DOM hierarchies are illustrated in FIG. 6B and FIG. 6C, which will be described in further detail below.

At block 260, for each custom component, system 100 restricts access of the custom component to all inaccessible components the custom component cannot provide a key for. In some implementations, within the virtual DOM all inaccessible components will be blocked off, invisible or designated as inaccessible by the custom component in question. In some implementations, if the custom component attempts to make method calls of inaccessible components, or use variables or code of inaccessible components, system 100 will return an exception or error message. In some implementations, access to the real, original DOM of the web-based application is restricted for each custom component. Rather than accessing the DOM and global variables directly, custom components work within the virtual DOM, wherein access to components is limited based on the security model.

In some implementations, system 100 restricts access of custom components to all private API components. Within the component-based security model, private, undocumented API components are prohibited from being accessed by custom components and by developers working with those custom components.

Figure 3:
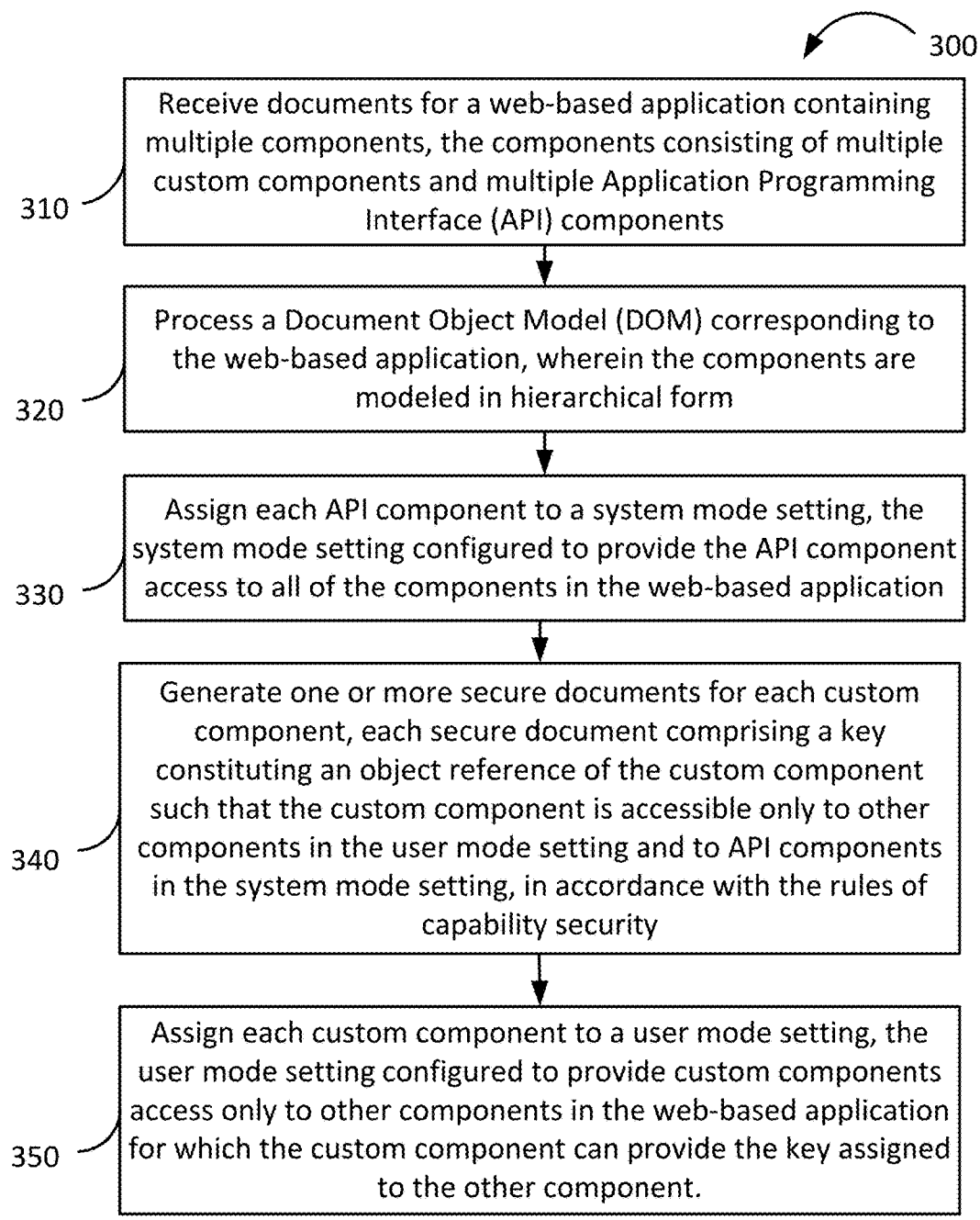
FIG. 3 shows a flowchart of an example of a method 300 for providing security modes for a component-based web security model, performed in accordance with some implementations.

FIG. 3 shows a flowchart of an example of a method 300 for providing security modes for a component-based web security model, performed in accordance with some implementations. Method 300 and other methods described herein may be implemented using system 100 of FIG. 1, although the implementations of such methods are not limited to system 100.

At block 310, system 100 receives documents for a web-based application containing multiple components, the components consisting of multiple custom components and multiple API components. In some implementations, the documents are received through a browser at the client system 108. In some implementations, the documents may contain or relate to JavaScript, HTML, XML, or any other code or methods for generating web applications. For example, system 100, through a browser on client system 108, may receive documents from a remote server with JavaScript and HTML for generating a web application. Custom components may be components that are developed by a specific developer for use in the developer's application, or third-party components that are developed for use in the developer's application. In some implementations, API components may be publicly documented API components, or private, undocumented API components that are not intended to be accessible to custom components. In some implementations, system 100 determines the API components are trusted or verified in some way within the system. In some implementations, system 100 determines the API components are trusted or verified by analyzing a whitelist of components and/or domains that are trusted or verified.

In some implementations, system 100 determines whether each API component is a private API component or a public API component. In some implementations, the determination is performed by analyzing a list of public API components and/or a list of private API components authorized by system 100. In some implementations, API components may contain metadata which identifies them as public API components or private API components.

At block 320, system 100 processes a DOM corresponding to the web-based application, wherein the components are modeled in hierarchical form. In some implementations, system 100 is configured to generate a DOM for a web application based on the characteristics and dependencies of each component within the web application.

At block 330, system 100 assigns each API component to a system mode setting. The system mode setting is configured to provide the API component access to all of the components in the web-based application. For example, in a web-based application with several public and private API components and several custom components, the API components will all have access to the full number of components, their methods, and their data.

At block 340, system 100 generates one or more secure documents for each custom component. A secure document is a document that consists of most or all of the contents of the original document within the custom component. Each secure document contains a key constituting an object reference of the custom component, such that the custom component is accessible only to other components possessing the key in the user mode setting and to API components in the system mode setting, in accordance with the rules of capability security. Since a custom component in user mode must possess the key of another component in user mode in order to access it, a developer may only be able to work with a limited set of secure documents pertaining to the accessible components. In some implementations, the developer will not have access to or ability to manipulate the original documents. In some implementations, upon generating the one or more secure documents for a custom component, access to the one or more original documents associated with the custom component is prohibited to all components except for API components In some implementations, system 100 provides keys for all custom components to all API components assigned to a system mode setting. This universal access to keys by system mode API components is sometimes called a "master key." Since API components are trusted, authorized components that can access the original DOM and all global elements, they are also trusted with access to all of the custom components, and they are capable of unlocking any component's capability security mechanism with this master key.

In some implementations, system 100 determines, by an API component assigned to a system mode setting, that a custom component assigned to a user mode setting can provide the key to another custom component assigned to a user mode setting. An API component may therefore act as a security gatekeeper for ensuring that components have the proper keys to be able to access keyed components. In some implementations, the API component has master key access to all components, so it may serve this security gatekeeper role by regulating component access to other components.

In some implementations, system 100 generates a stamp associated with each custom component, wherein the stamp uniquely identifies a capability security mechanism, or "lock", associated with the custom component, and prevents the lock from being spoofed or copied as part of an attack or exploit. In some situations, despite the security offered by providing a key for a lock to access a component, a malicious party may spoof the lock itself, or otherwise tamper with the capability security mechanism. To prevent this, a stamp may be generated that uniquely identifies the lock, and system 100 stores and keeps track of all locks created in the session. If a lock does not match a stamp, then system 100 prohibits the key from being used in the lock, even if the key provided may fit that lock. This prevents malicious parties from spoofing and bypassing security functions within the security model. In some implementations, system 100 determines, upon a component providing a key for another component, that the capability security mechanism of the other component is associated with the stamp for that other component.

At block 350, system 100 assigns each component to a user mode setting. The user mode setting is configured to provide custom components access only to other components in the web-based application for which the custom component can provide the key assigned to the other component.

In some implementations, for each component, system 100 restricts access to other custom components for which the custom component cannot provide the key. In some implementations, access may be restricted by blocking off visibility and access within a virtual DOM. In some implementations, for each component, system 100 restricts access to private API components. Such restricted access promotes best security practices by preventing developers access to private, undocumented APIs that are not designed to be accessed publicly and that can contain security exploits. In some implementations, components within the user mode setting are provided access by system 100 to public API components. Since public API components are documented, authorized, and fully available for developers to use, they are allowed to be visible and accessible to custom components.

In some implementation, one or more additional security modes may be present that are different and distinguishable from the system mode and user mode described above. In some implementations, an additional security mode restricts access of a component to one or more other components. In some implementations, an additional security mode provides access of the component to one or more other components. It will be appreciated that a wide variety of security modes may exist, providing various degrees and types of granularity and access control of parts of the DOM to components.

Figure 4:
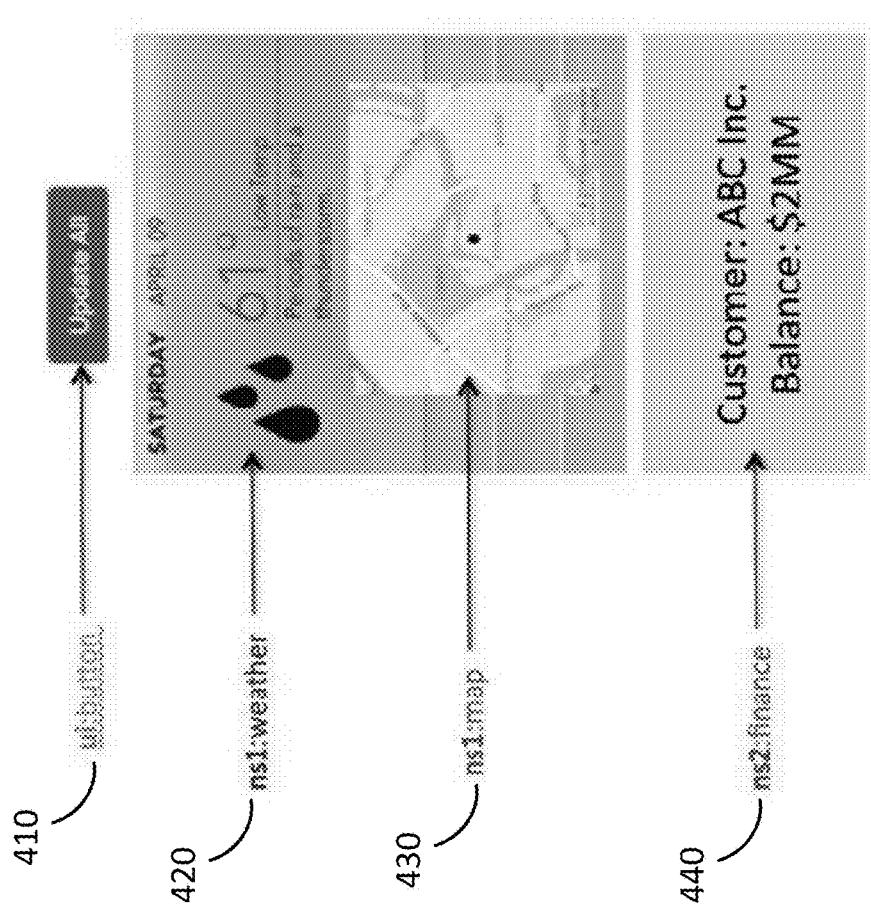
FIG. 4 shows an example of a component-based web application, in accordance with some implementations.

FIG. 4 shows an example of a component-based web application, in accordance with some implementations. Multiple components are present within the web application, and combine together to create a functional application. In some implementation, the view as shown in FIG. 4 is the view that is presented to a client using client system 108. In some implementations, a browser may display the view within the client system 108.

The ui:button component 410 is a button component of the web application. The button serves the purpose of updating all of the other components within the web application. In some implementations, when a user clicks on the button, system 100 retrieves the latest data from the other components by calling their methods. The button component is a private API component, and is undocumented. ns1:weather component 420 is a weather component that serves the purpose of presenting up-to-date weather to the user. In this example, the weather component displays the temperature, day, date, chance of rain, and other weather information based on a user's location. ns1:map component 430 is a map component that shows the location of the user and surrounding area within a map displayable to the user. ns2:finance component 440 is a finance component that shows details of the user's finances. In this example, it displays the name of a customer, and the balance of that customer in dollars.

Figure 5B:
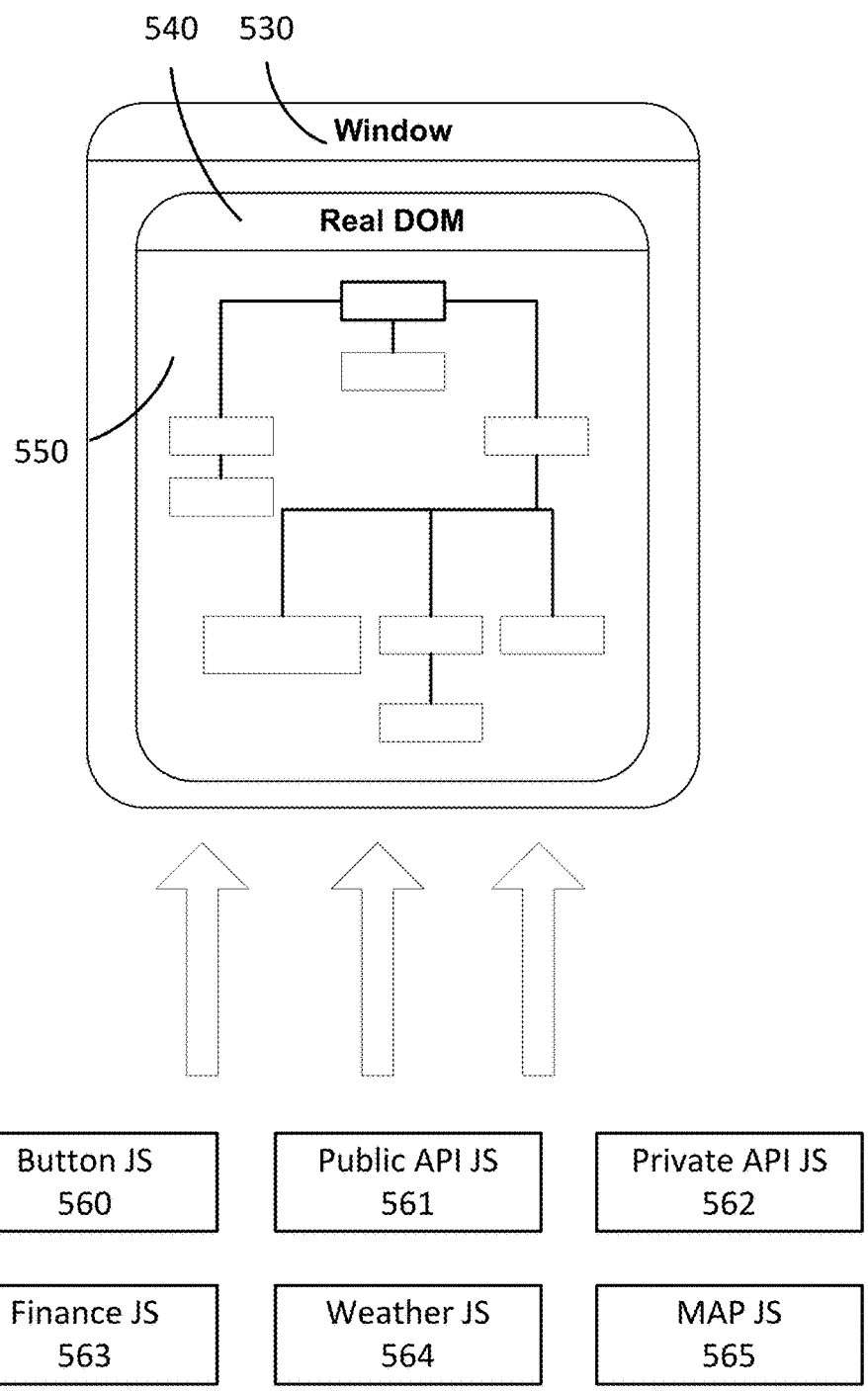
FIG. 5B is an example of a DOM in a traditional security model with JavaScript functions being called, in accordance with some implementations.
Figure 5C:
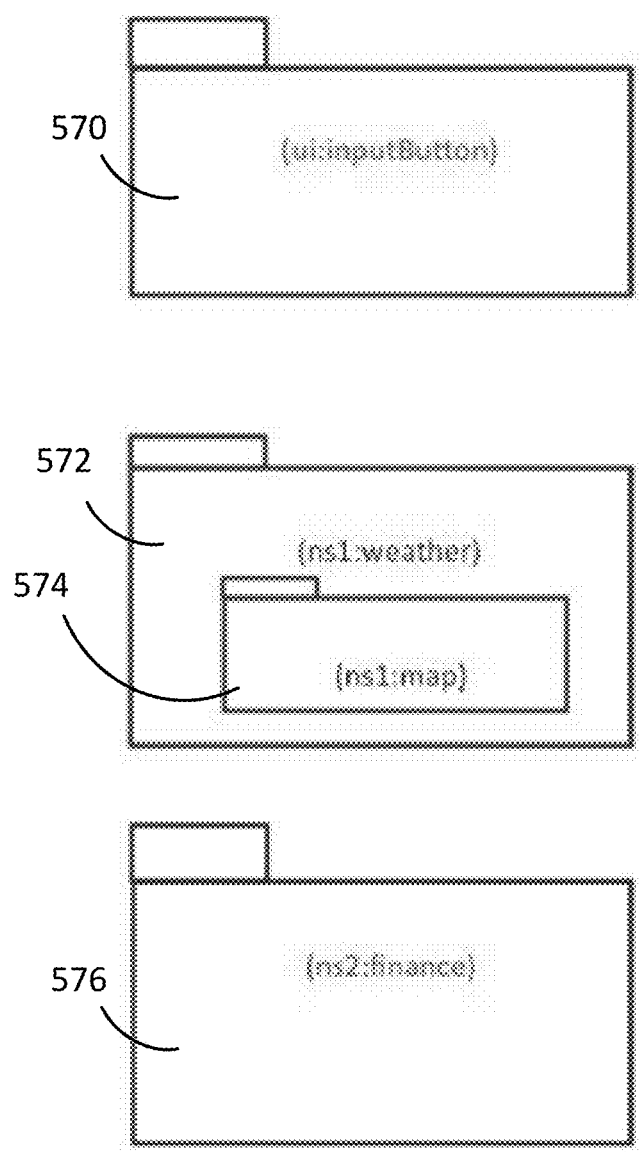
FIG. 5C is an example of the included components within a web application under the traditional security model, in accordance with some implementations.

FIG. 5A, FIG. 5B, and FIG. 5C are examples of a component-based web application operating under a traditional security model, rather than the component-based security model described herein.

FIG. 5A is an example of a DOM representing a component-based web application in a traditional security model, in accordance with some implementations. Window 510 represents the window of a web-application that contains the content displayed for that web application. Real DOM 512 is a real, non-virtual DOM that the system processes for the given web application. Within real DOM 512, the document and its objects are displayed. Document object 520 is at the top of the hierarchy, as it is the main <document> tag that contains all of the contents for the document. Under the document object 520 are a head object 522, html object 521, and body object 523. Under the body object 523 are branching components for a button object 525, weather object 526, map object 528, and finance object 527. The button object 525 is a private API component, while the weather object 526, map object 528, and finance object 527 are all custom components.

FIG. 5B is an example of a DOM in a traditional security model with JavaScript functions being called, in accordance with some implementations. Window 530, real DOM 540, and the DOM hierarchy 550 are depicted, as in FIG. 5A. JavaScript functions 560-565 depict functions for the button, public API, private API, finance, weather, and map components being called by the various components. Within this traditional security model, any JavaScript of any component can call any JavaScript functions of any other component, as they are all loaded into the DOM. Any JavaScript can also call any undocumented, private API component. In addition, any JavaScript can access the real DOM, and receive rendered data from other components. Finally, as there is no security review of components, a number of security issues can be present within this example, including cross-site scripting.

FIG. 5C is an example of the included components within a web application under the traditional security model, in accordance with some implementations. FIG. 5C shows the ui:button component 570, the ns1:weather component 572, the ns1:map component 574 that is dependent on the weather component 572, and the ns2:finance component 576.

Figure 6A:
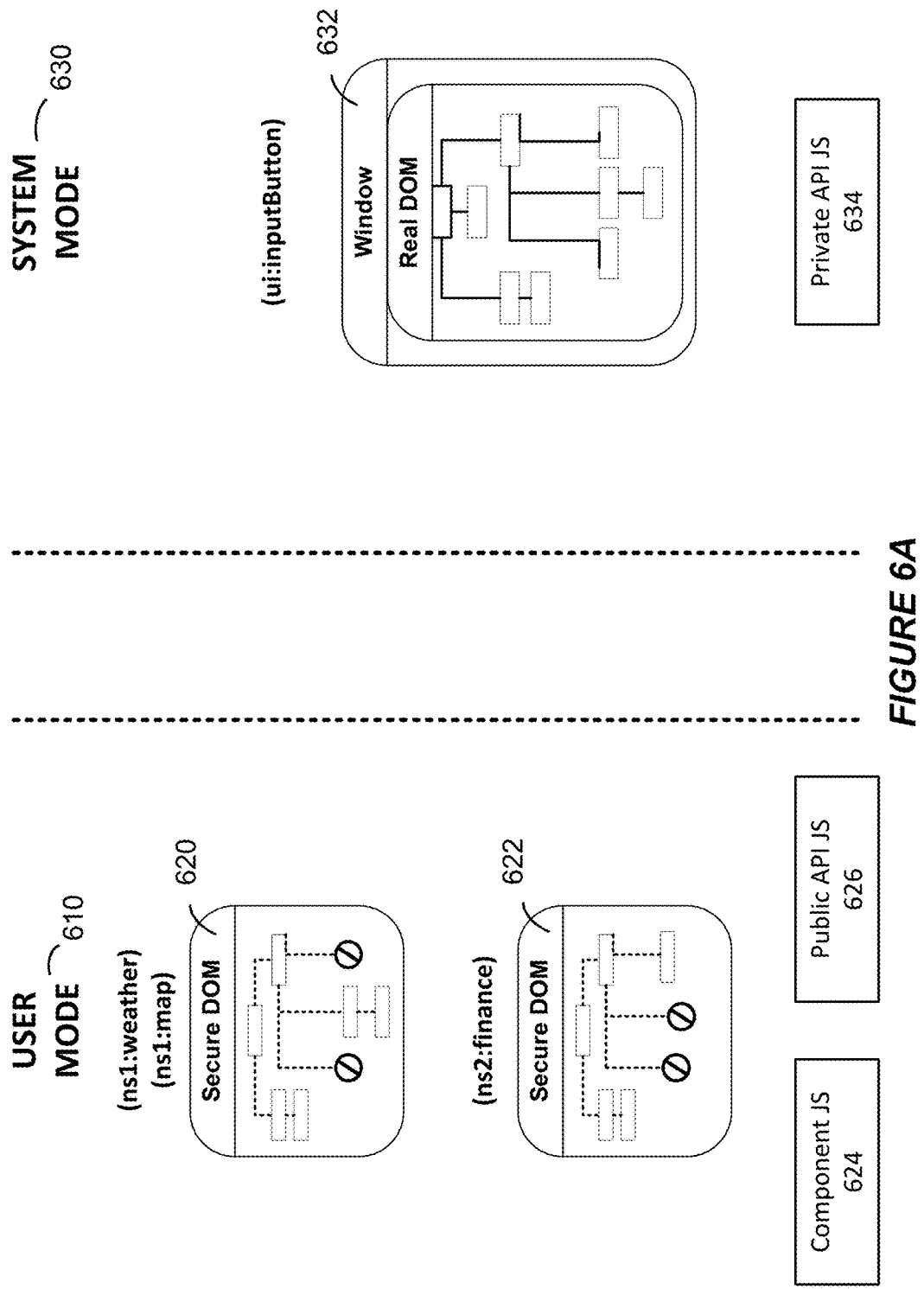
FIG. 6A is an example of DOMs for encapsulated components in a web application under a component-based security model, in accordance with some implementations.
Figure 6B:
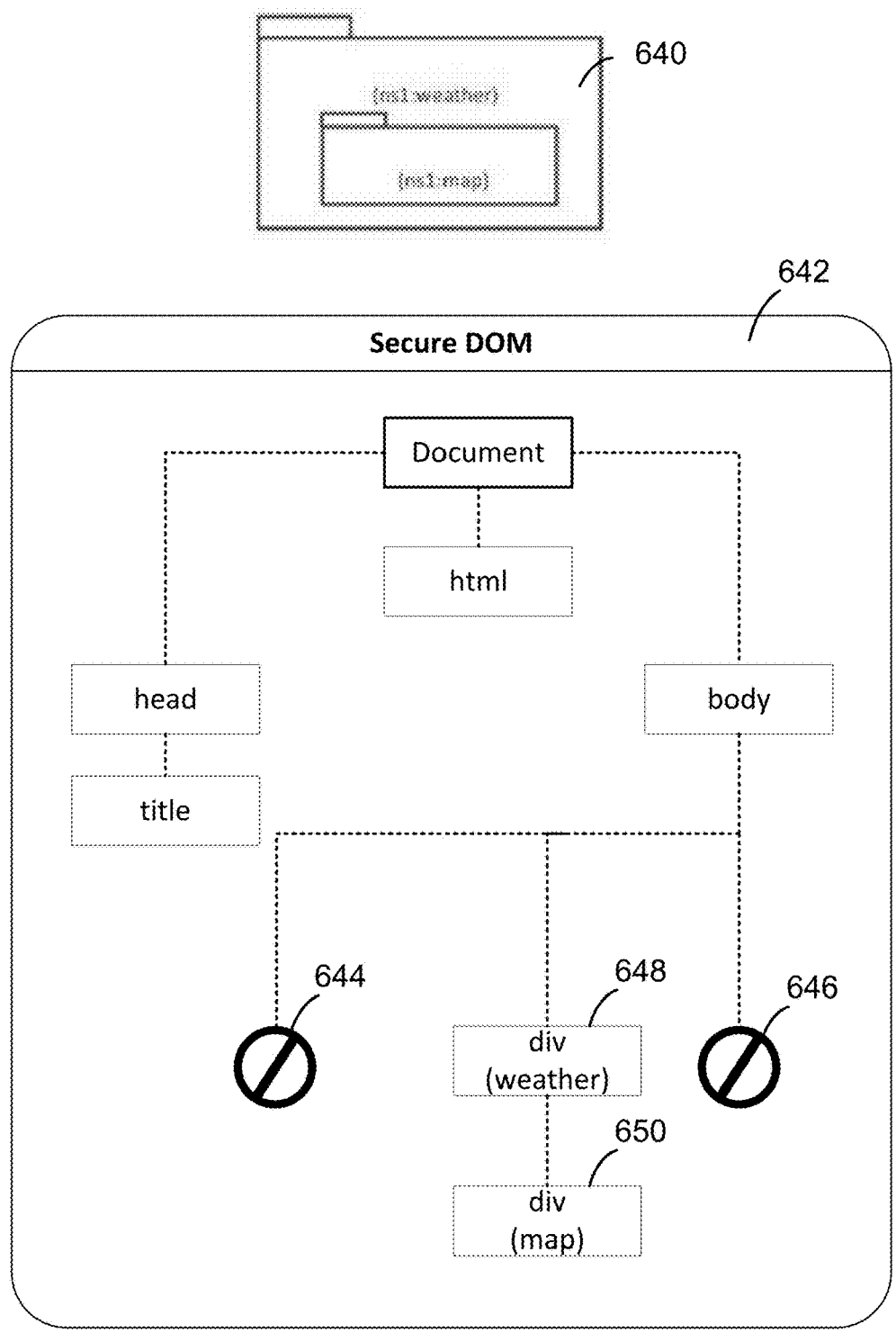
FIG. 6B is an example of a virtual DOM for a custom component under a component-based security model, in accordance with some implementations.
Figure 6C:
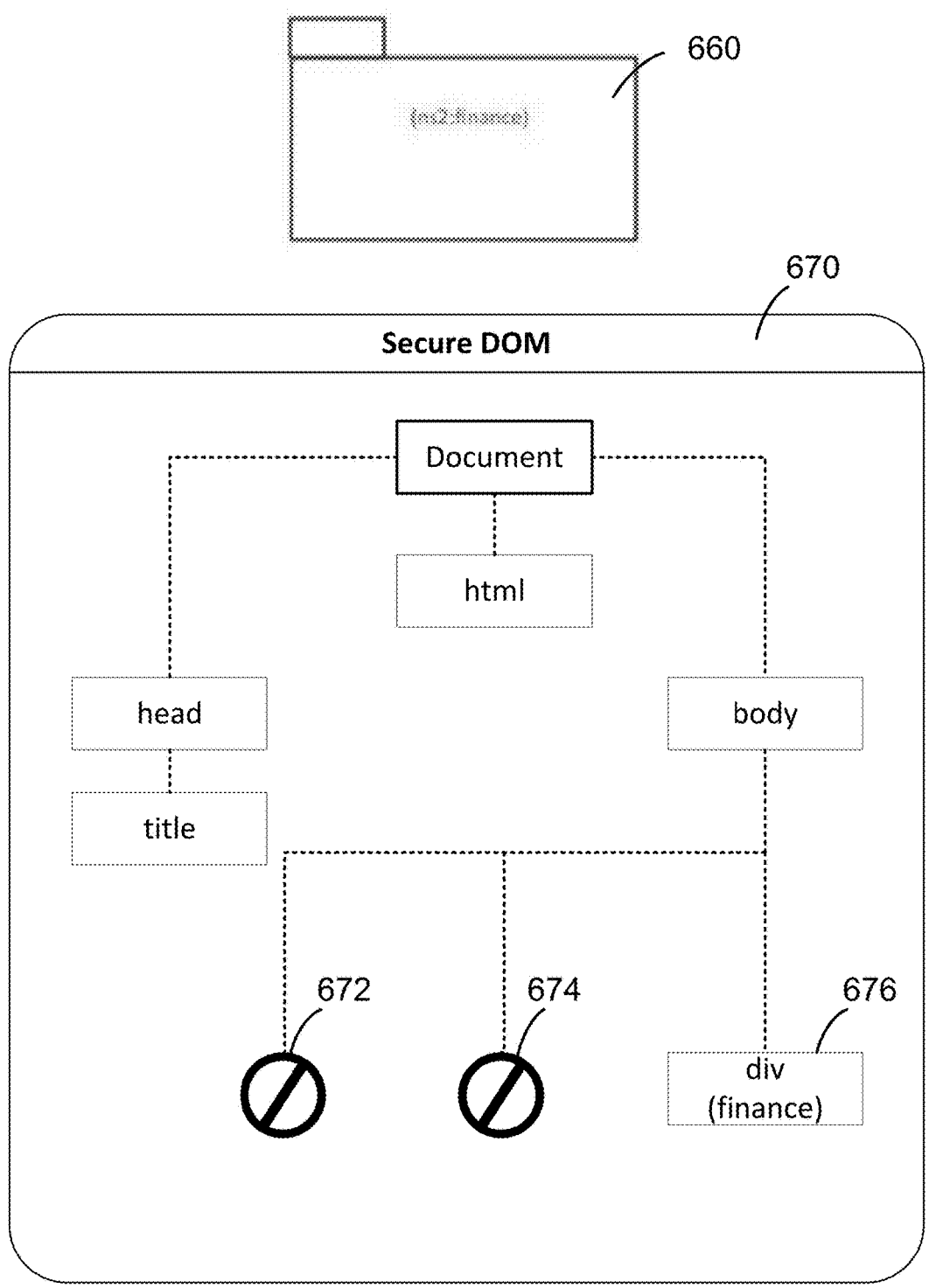
FIG. 6C is an example of a virtual DOM for a custom component under a component-based security model, in accordance with some implementations.

FIG. 6A, FIG. 6B, and FIG. 6C are examples of a component-based web application operating under a component-based security model with security modes.

FIG. 6A is an example of DOMs for encapsulated components in a web application under a component-based security model, in accordance with some implementations.

Under this component-based security model, in some implementations the components may be divided between two or more security modes. In this example, custom components are assigned to a user mode 610, while API components are assigned to a system mode 630. The system mode 630 includes an button component 632, consisting of a window containing a real DOM, with all objects within the web application represented in a hierarchical form. The button component is a private API component in this example; in some implementations, this means that the API component has not been publicly documented, and is not publicly accessible or intended to be called by developers. Within the system mode 630, public and private APIs have full access to the real DOM and real document of the web application, including methods of the components. In addition, custom components will only be able to access public and documented API components, and won't be able to access private, undocumented APIs. In this example, the private API JavaScript 634 is accessible to the button component 632, but not to any of the components in user mode 610.

Weather and map components 620 and finance component 622 are assigned to user mode 610. These components are custom components. The weather and map components 620 are third-party components that have been written by a third party rather than the web application's developers. The finance component 622, however, is a custom component written by the web application's developers. The weather and map components 620 are assigned virtual DOMs that appear identical. The finance component 622 is assigned a virtual DOM that appears different. In this example, namespace of organizations within system 100 determines keys and access. In some implementations, keys are assigned to all components. The weather and map components are assigned keys based on the namespace of the third party developer, and will possess keys such that they are accessible to each other. This is reflected in the secure DOM hierarchy for the weather and map components, which depicts the weather and map components being visible and accessible, but the button and finance components being crossed out and inaccessible. This is because the button component is a private API that cannot be viewed or accessed by custom components in user mode 610, and the finance button is a custom component that is in a different namespace and has a key that the weather and map components do not possess. The finance component 622, meanwhile, has the button, weather, and map components crossed out and inaccessible, because they are, respectively, a private API component, and two third-party custom components under a different namespace that the finance component does not possess the key for. In this way, private API components such as button component 632 and private API JavaScript 634 and inaccessible to the custom components in the user mode 610. Custom components are also inaccessible to each other if they do not possess the key for each other. Component JavaScript 624 is sometimes accessible to custom components depending on if a component possesses the key to access it. Public API JavaScript 626 is always accessible to custom components. Public API components and JavaScript are trusted and publicly documents, and are intended for use by developers. Thus, accessing these API components is necessary for proper functionality of web applications using public APIs.

FIG. 6B is an example of a virtual DOM for a custom component under a component-based security model, in accordance with some implementations.

A weather component and a map component, 640, are illustrated. System 100 processes or generates a secure, virtual DOM 642 for the weather component. The map component is a dependent child of the weather component. Within the secure DOM 642, objects are modeled in hierarchical form, with access and visibility presented only for identified components that are public API components or are custom components for which the weather component possesses a key. Here, an button component 644 is crossed out and inaccessible, as it is a private API component that user mode components cannot access. A finance component 646 is also crossed out and inaccessible, because it is a custom component in a different namespace, from a different developer, and the weather component does not possess the key for the finance component. The weather component does have full access and visibility to itself as shown in weather component 648, and also have full access and visibility to its dependent component, map component 650.

FIG. 6C is an example of a virtual DOM for a custom component under a component-based security model, in accordance with some implementations.

A finance component 660 is illustrated. System 100 processes or generates a secure, virtual DOM 670 for the finance component. Within the secure DOM 670, objects are modeled in hierarchical form, with access and visibility presented only for identified components that are public API components or are custom components for which the finance component possesses a key. Here, an button 672 is crossed out and inaccessible, as it is a private API component that user mode components cannot access. The weather and map components 674 are also crossed out and inaccessible, because they are third party custom components in a different namespace, from a different developer, and the finance component does not possess the keys for the weather and map components. The finance component does have full access and visibility to itself as shown in finance component 676.

Systems, apparatus, and methods are described below for implementing database systems and enterprise level social and business information networking systems in conjunction with the disclosed techniques. Such implementations can provide more efficient use of a database system. For instance, a user of a database system may not easily know when important information in the database has changed, e.g., about a project or client. Such implementations can provide feed tracked updates about such changes and other events, thereby keeping users informed.

By way of example, a user can update a record in the form of a CRM record, e.g., an opportunity such as a possible sale of 1000 computers. Once the record update has been made, a feed tracked update about the record update can then automatically be provided, e.g., in a feed, to anyone subscribing to the opportunity or to the user. Thus, the user does not need to contact a manager regarding the change in the opportunity, since the feed tracked update about the update is sent via a feed to the manager's feed page or other page.

Figure 7A:
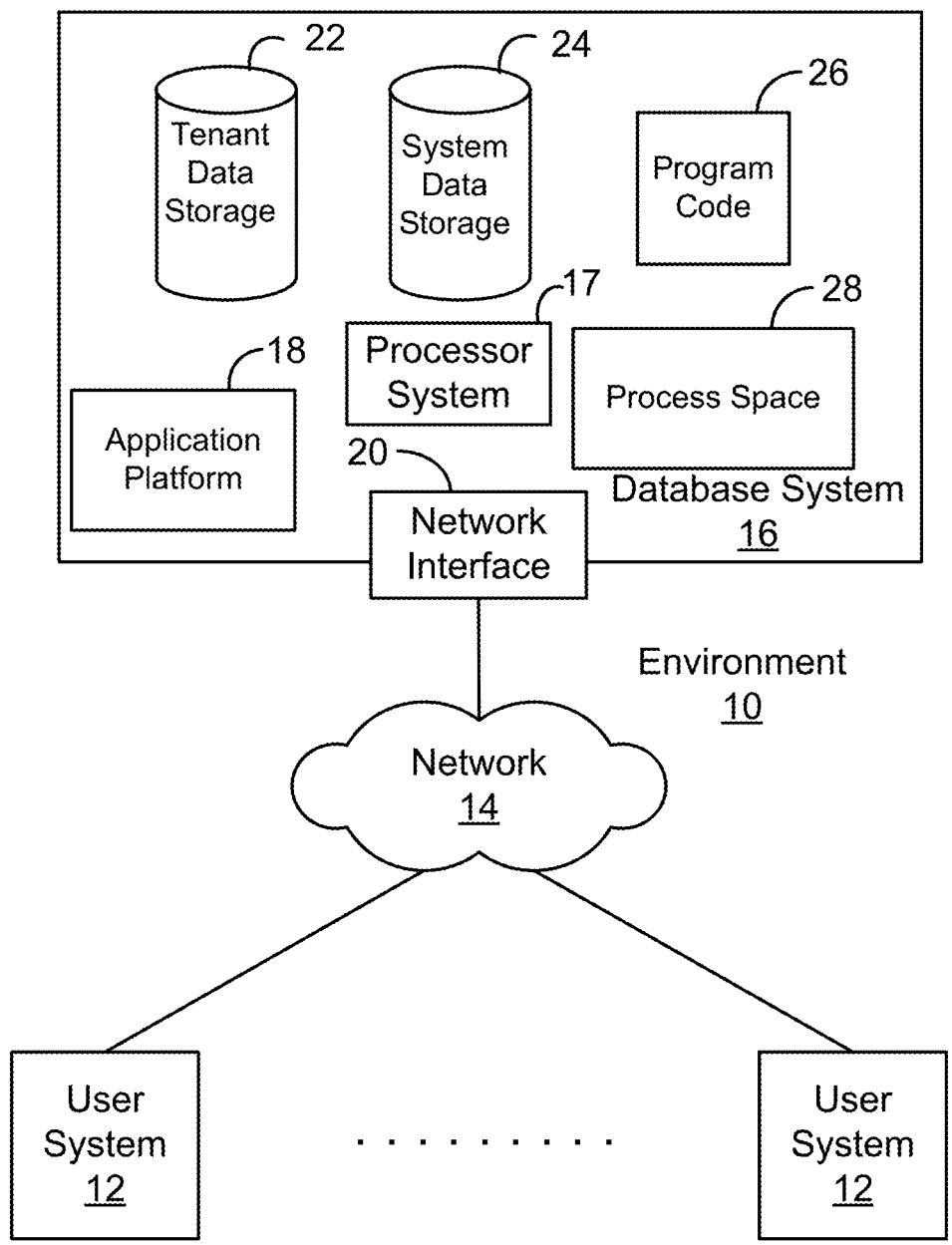
FIG. 7A shows a block diagram of an example of an environment 10 in which an on-demand database service can be used in accordance with some implementations.

FIG. 7A shows a block diagram of an example of an environment 10 in which an on-demand database service exists and can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As illustrated in FIG. 7A (and in more detail in FIG. 7B) user systems 12 might interact via a network 14 with an on-demand database service, which is implemented in the example of FIG. 7A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). A non-relational database management system (NRDBMS) or the equivalent may execute storage and fast retrieval of large sets of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 7A, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 7B:
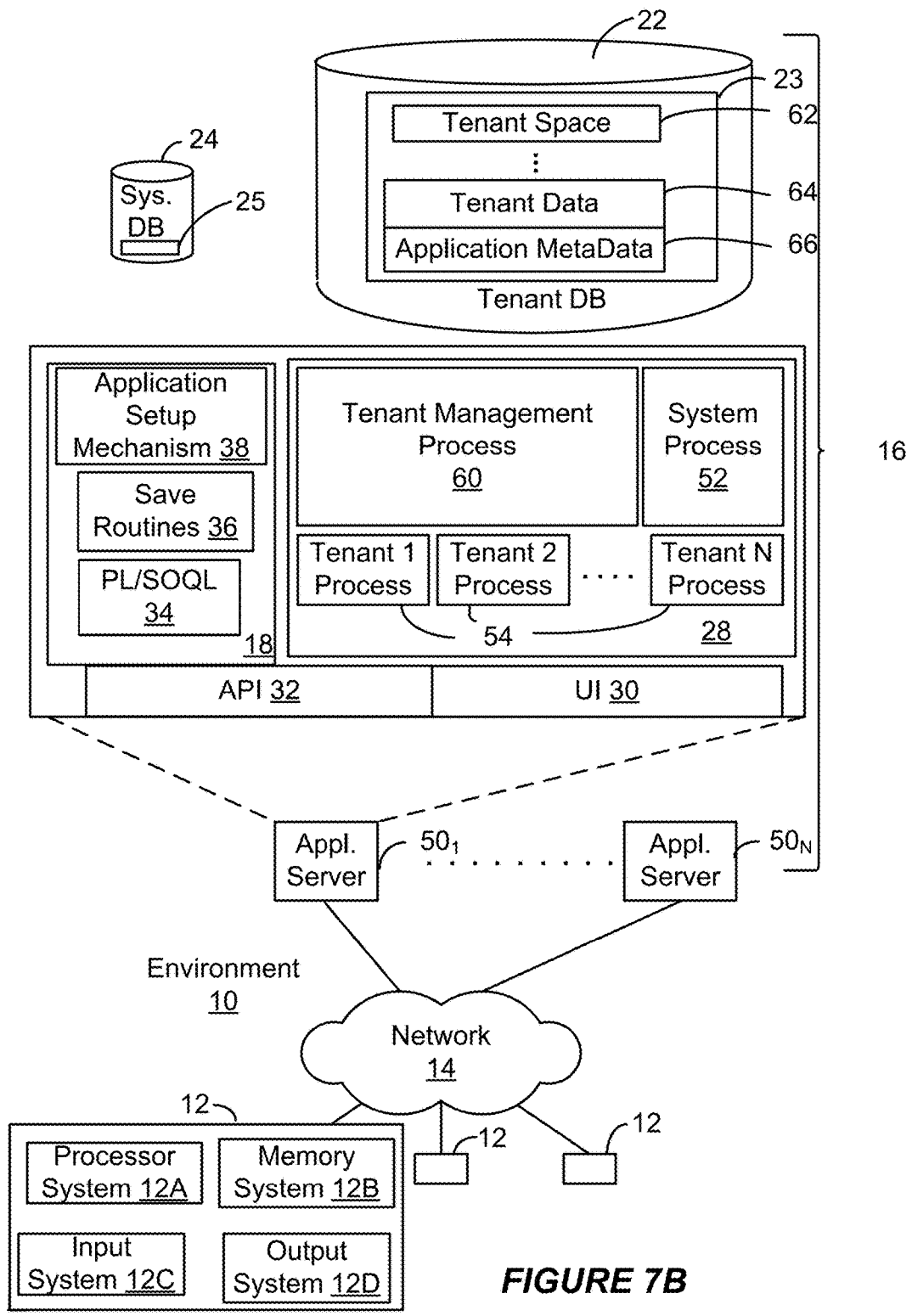
FIG. 7B shows a block diagram of an example of some implementations of elements of FIG. 7A and various possible interconnections between these elements.

One arrangement for elements of system 16 is shown in FIGS. 7A and 7B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 7A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 7B shows a block diagram of an example of some implementations of elements of FIG. 7A and various possible interconnections between these elements. That is, FIG. 7B also illustrates environment 10. However, in FIG. 7B elements of system 16 and various interconnections in some implementations are further illustrated. FIG. 7B shows that user system 12 may include processor system 12A, memory system 12B, input system 12C, and output system 12D. FIG. 7B shows network 14 and system 16. FIG. 7B also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 7A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 7B, system 16 may include a network interface 20 (of FIG. 7A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 8A:
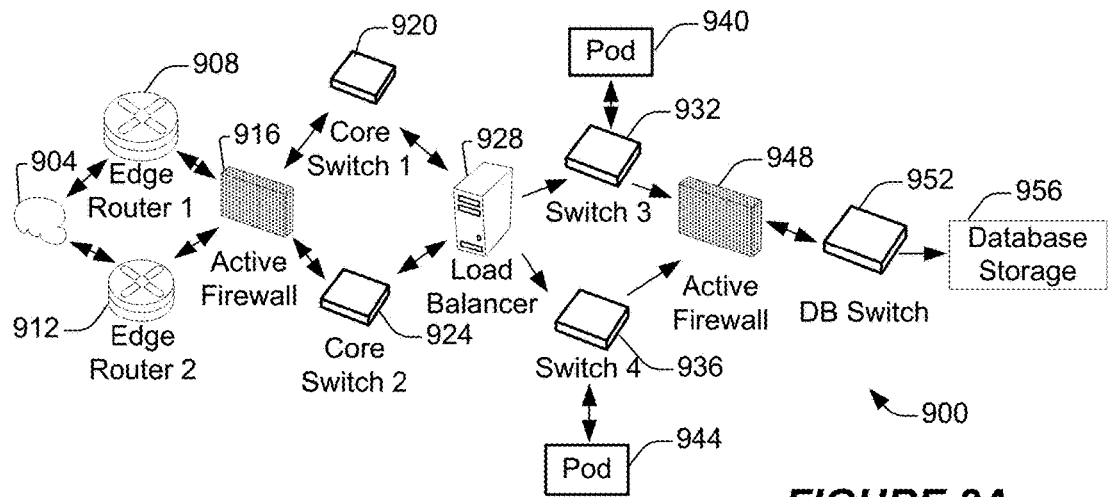
FIG. 8A shows a system diagram of an example of architectural components of an on-demand database service environment 900, in accordance with some implementations.

FIG. 8A shows a system diagram of an example of architectural components of an on-demand database service environment 900, in accordance with some implementations. A client machine located in the cloud 904, generally referring to one or more networks in combination, as described herein, may communicate with the on-demand database service environment via one or more edge routers 908 and 912. A client machine can be any of the examples of user systems 12 described above. The edge routers may communicate with one or more core switches 920 and 924 via firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand database service environment may communicate with a database storage 956 via a database firewall 948 and a database switch 952.

Figure 8B:
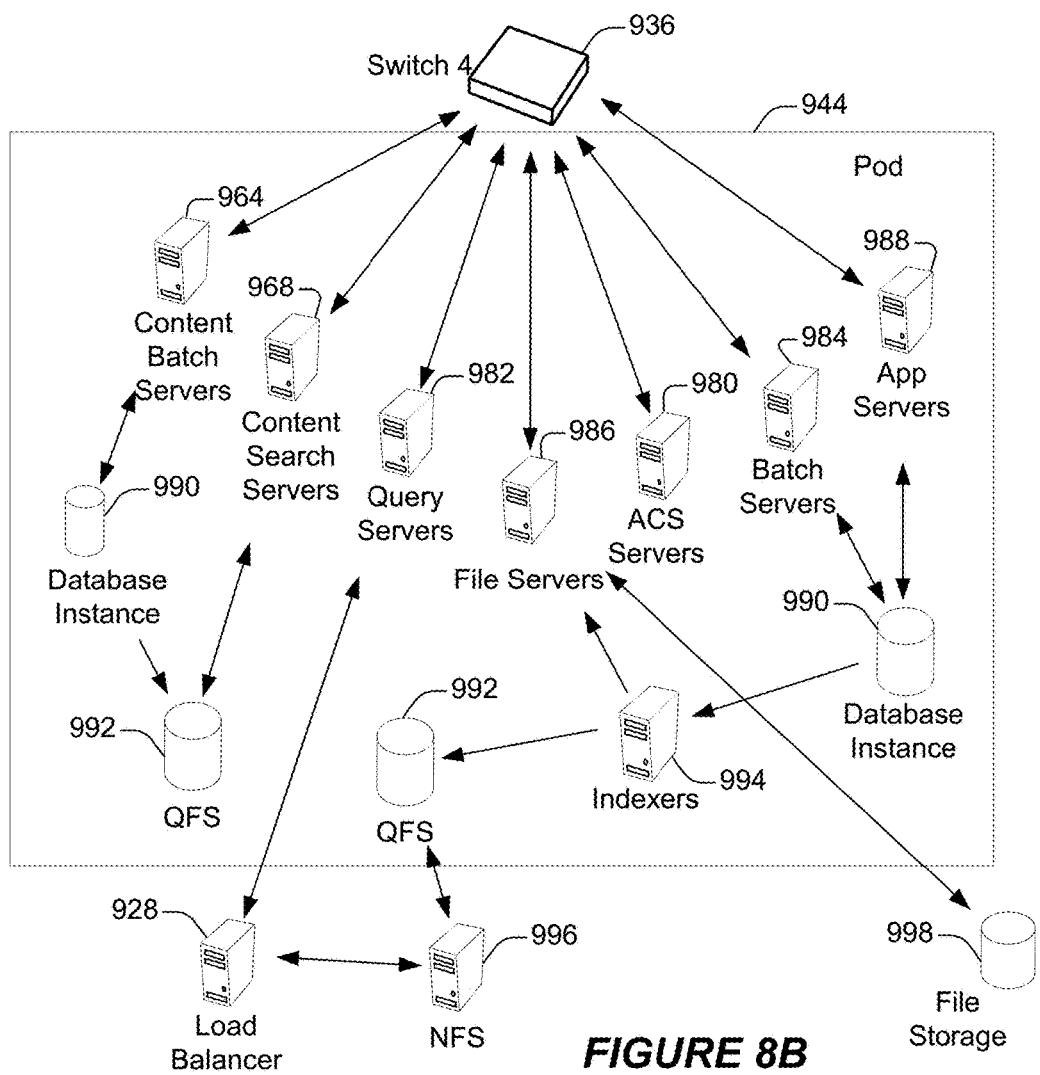
FIG. 8B shows a system diagram further illustrating an example of architectural components of an on-demand database service environment, in accordance with some implementations.

As shown in FIGS. 8A and 8B, accessing an on-demand database service environment may involve communications transmitted among a variety of different hardware and/or software components. Further, the on-demand database service environment 900 is a simplified representation of an actual on-demand database service environment. For example, while only one or two devices of each type are shown in FIGS. 8A and 8B, some implementations of an on-demand database service environment may include anywhere from one to many devices of each type. Also, the on-demand database service environment need not include each device shown in FIGS. 8A and 8B, or may include additional devices not shown in FIGS. 8A and 8B.

Moreover, one or more of the devices in the on-demand database service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or combination of data networks, often including the Internet. Client machines located in the cloud 904 may communicate with the on-demand database service environment to access services provided by the on-demand database service environment. For example, client machines may access the on-demand database service environment to retrieve, store, edit, and/or process information.

In some implementations, the edge routers 908 and 912 route packets between the cloud 904 and other components of the on-demand database service environment 900. The edge routers 908 and 912 may employ the Border Gateway Protocol (BGP). The BGP is the core routing protocol of the Internet. The edge routers 908 and 912 may maintain a table of IP networks or 'prefixes', which designate network reachability among autonomous systems on the Internet.

In one or more implementations, the firewall 916 may protect the inner components of the on-demand database service environment 900 from Internet traffic. The firewall 916 may block, permit, or deny access to the inner components of the on-demand database service environment 900 based upon a set of rules and other criteria. The firewall 916 may act as one or more of a packet filter, an application gateway, a stateful filter, a proxy server, or any other type of firewall.

In some implementations, the core switches 920 and 924 are high-capacity switches that transfer packets within the on-demand database service environment 900. The core switches 920 and 924 may be configured as network bridges that quickly route data between different components within the on-demand database service environment. In some implementations, the use of two or more core switches 920 and 924 may provide redundancy and/or reduced latency.

In some implementations, the pods 940 and 944 may perform the core data processing and service functions provided by the on-demand database service environment. Each pod may include various types of hardware and/or software computing resources. An example of the pod architecture is discussed in greater detail with reference to FIG. 8B.

In some implementations, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some implementations, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some implementations, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, communication with the database storage 956 may be conducted via the database switch 952. The multi-tenant database storage 956 may include more than one hardware and/or software components for handling database queries. Accordingly, the database switch 952 may direct database queries transmitted by other components of the on-demand database service environment (e.g., the pods 940 and 944) to the correct components within the database storage 956.

In some implementations, the database storage 956 is an on-demand database system shared by many different organizations. The on-demand database service may employ a multi-tenant approach, a virtualized approach, or any other type of database approach. On-demand database services are discussed in greater detail with reference to FIGS. 8A and 8B.

FIG. 8B shows a system diagram further illustrating an example of architectural components of an on-demand database service environment, in accordance with some implementations. The pod 944 may be used to render services to a user of the on-demand database service environment 900. In some implementations, each pod may include a variety of servers and/or other systems. The pod 944 includes one or more content batch servers 964, content search servers 968, query servers 982, file servers 986, access control system (ACS) servers 980, batch servers 984, and app servers 988. Also, the pod 944 includes database instances 990, quick file systems (QFS) 992, and indexers 994. In one or more implementations, some or all communication between the servers in the pod 944 may be transmitted via the switch 936.

The content batch servers 964 may handle requests internal to the pod. These requests may be long-running and/or not tied to a particular customer. For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand database service environment.

The file servers 986 may manage requests for information stored in the file storage 998. The file storage 998 may store information such as documents, images, and basic large objects (BLOBs). By managing requests for information using the file servers 986, the image footprint on the database may be reduced.

The query servers 982 may be used to retrieve information from one or more file systems. For example, the query system 982 may receive requests for information from the app servers 988 and then transmit information queries to the NFS 996 located outside the pod.

The pod 944 may share a database instance 990 configured as a multi-tenant environment in which different organizations share access to the same database. Additionally, services rendered by the pod 944 may call upon various hardware and/or software resources. In some implementations, the ACS servers 980 may control access to data, hardware resources, or software resources.

In some implementations, the batch servers 984 may process batch jobs, which are used to run tasks at specified times. Thus, the batch servers 984 may transmit instructions to other servers, such as the app servers 988, to trigger the batch jobs.

In some implementations, the QFS 992 may be an open source file system available from Sun Microsystems® of Santa Clara, Calif. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some implementations, one or more query servers 982 may communicate with the NFS 996 to retrieve and/or update information stored outside of the pod 944. The NFS 996 may allow servers located in the pod 944 to access information to access files over a network in a manner similar to how local storage is accessed.

In some implementations, queries from the query servers 922 may be transmitted to the NFS 996 via the load balancer 928, which may distribute resource requests over various resources available in the on-demand database service environment. The NFS 996 may also communicate with the QFS 992 to update the information stored on the NFS 996 and/or to provide information to the QFS 992 for use by servers located within the pod 944.

In some implementations, the pod may include one or more database instances 990. The database instance 990 may transmit information to the QFS 992. When information is transmitted to the QFS, it may be available for use by servers within the pod 944 without using an additional database call.

In some implementations, database information may be transmitted to the indexer 994. Indexer 994 may provide an index of information available in the database 990 and/or QFS 992. The index information may be provided to file servers 986 and/or the QFS 992.

Some but not all of the techniques described or referenced herein are implemented as part of or in conjunction with a social networking database system, also referred to herein as a social networking system or as a social network. Social networking systems have become a popular way to facilitate communication among people, any of whom can be recognized as users of a social networking system. One example of a social networking system is Chatter®, provided by salesforce.com, inc. of San Francisco, Calif. salesforce.com, inc. is a provider of social networking services, CRM services and other database management services, any of which can be accessed and used in conjunction with the techniques disclosed herein in some implementations. These various services can be provided in a cloud computing environment, for example, in the context of a multi-tenant database system. Thus, the disclosed techniques can be implemented without having to install software locally, that is, on computing devices of users interacting with services available through the cloud. While the disclosed implementations are often described with reference to Chatter®, those skilled in the art should understand that the disclosed techniques are neither limited to Chatter® nor to any other services and systems provided by salesforce.com, inc. and can be implemented in the context of various other database systems and/or social networking systems such as Facebook®, LinkedIn®, Twitter®, Google+®, Yammer® and Jive® by way of example only.

Some social networking systems can be implemented in various settings, including organizations. For instance, a social networking system can be implemented to connect users within an enterprise such as a company or business partnership, or a group of users within such an organization. For instance, Chatter® can be used by employee users in a division of a business organization to share data, communicate, and collaborate with each other for various social purposes often involving the business of the organization. In the example of a multi-tenant database system, each organization or group within the organization can be a respective tenant of the system, as described in greater detail herein.

In some social networking systems, users can access one or more social network feeds, which include information updates presented as items or entries in the feed. Such a feed item can include a single information update or a collection of individual information updates. A feed item can include various types of data including character-based data, audio data, image data and/or video data. A social network feed can be displayed in a graphical user interface (GUI) on a display device such as the display of a computing device as described herein. The information updates can include various social network data from various sources and can be stored in an on-demand database service environment. In some implementations, the disclosed methods, apparatus, systems, and computer-readable storage media may be configured or designed for use in a multi-tenant database environment.

In some implementations, a social networking system may allow a user to follow data objects in the form of CRM records such as cases, accounts, or opportunities, in addition to following individual users and groups of users. The "following" of a record stored in a database, as described in greater detail herein, allows a user to track the progress of that record when the user is subscribed to the record. Updates to the record, also referred to herein as changes to the record, are one type of information update that can occur and be noted on a social network feed such as a record feed or a news feed of a user subscribed to the record. Examples of record updates include field changes in the record, updates to the status of a record, as well as the creation of the record itself. Some records are publicly accessible, such that any user can follow the record, while other records are private, for which appropriate security clearance/permissions are a prerequisite to a user following the record.

Information updates can include various types of updates, which may or may not be linked with a particular record. For example, information updates can be social media messages submitted by a user or can otherwise be generated in response to user actions or in response to events. Examples of social media messages include: posts, comments, indications of a user's personal preferences such as "likes" and "dislikes", updates to a user's status, uploaded files, and user-submitted hyperlinks to social network data or other network data such as various documents and/or web pages on the Internet. Posts can include alpha-numeric or other character-based user inputs such as words, phrases, statements, questions, emotional expressions, and/or symbols. Comments generally refer to responses to posts or to other information updates, such as words, phrases, statements, answers, questions, and reactionary emotional expressions and/or symbols. Multimedia data can be included in, linked with, or attached to a post or comment. For example, a post can include textual statements in combination with a JPEG image or animated image. A like or dislike can be submitted in response to a particular post or comment. Examples of uploaded files include presentations, documents, multimedia files, and the like.

Users can follow a record by subscribing to the record, as mentioned above. Users can also follow other entities such as other types of data objects, other users, and groups of users. Feed tracked updates regarding such entities are one type of information update that can be received and included in the user's news feed. Any number of users can follow a particular entity and thus view information updates pertaining to that entity on the users' respective news feeds. In some social networks, users may follow each other by establishing connections with each other, sometimes referred to as "friending" one another. By establishing such a connection, one user may be able to see information generated by, generated about, or otherwise associated with another user. For instance, a first user may be able to see information posted by a second user to the second user's personal social network page. One implementation of such a personal social network page is a user's profile page, for example, in the form of a web page representing the user's profile. In one example, when the first user is following the second user, the first user's news feed can receive a post from the second user submitted to the second user's profile feed. A user's profile feed is also referred to herein as the user's "wall," which is one example of a social network feed displayed on the user's profile page.

In some implementations, a social network feed may be specific to a group of users of a social networking system. For instance, a group of users may publish a news feed. Members of the group may view and post to this group feed in accordance with a permissions configuration for the feed and the group. Information updates in a group context can also include changes to group status information.

In some implementations, when data such as posts or comments input from one or more users are submitted to a social network feed for a particular user, group, object, or other construct within a social networking system, an email notification or other type of network communication may be transmitted to all users following the user, group, or object in addition to the inclusion of the data as a feed item in one or more feeds, such as a user's profile feed, a news feed, or a record feed. In some social networking systems, the occurrence of such a notification is limited to the first instance of a published input, which may form part of a larger conversation. For instance, a notification may be transmitted for an initial post, but not for comments on the post. In some other implementations, a separate notification is transmitted for each such information update.

The term "multi-tenant database system" generally refers to those systems in which various elements of hardware and/or software of a database system may be shared by one or more customers. For example, a given application server may simultaneously process requests for a great number of customers, and a given database table may store rows of data such as feed items for a potentially much greater number of customers.

An example of a "user profile" or "user's profile" is a database object or set of objects configured to store and maintain data about a given user of a social networking system and/or database system. The data can include general information, such as name, title, phone number, a photo, a biographical summary, and a status, e.g., text describing what the user is currently doing. As mentioned herein, the data can include social media messages created by other users. Where there are multiple tenants, a user is typically associated with a particular tenant. For example, a user could be a salesperson of a company, which is a tenant of the database system that provides a database service.

The term "record" generally refers to a data entity having fields with values and stored in database system. An example of a record is an instance of a data object created by a user of the database service, for example, in the form of a CRM record about a particular (actual or potential) business relationship or project. The record can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

The terms "social network feed" and "feed" are used interchangeably herein and generally refer to a combination (e.g., a list) of feed items or entries with various types of information and data. Such feed items can be stored and maintained in one or more database tables, e.g., as rows in the table(s), that can be accessed to retrieve relevant information to be presented as part of a displayed feed. The term "feed item" (or feed element) generally refers to an item of information, which can be presented in the feed such as a post submitted by a user. Feed items of information about a user can be presented in a user's profile feed of the database, while feed items of information about a record can be presented in a record feed in the database, by way of example. A profile feed and a record feed are examples of different types of social network feeds. A second user following a first user and a record can receive the feed items associated with the first user and the record for display in the second user's news feed, which is another type of social network feed. In some implementations, the feed items from any number of followed users and records can be combined into a single social network feed of a particular user.

As examples, a feed item can be a social media message, such as a user-generated post of text data, and a feed tracked update to a record or profile, such as a change to a field of the record. Feed tracked updates are described in greater detail herein. A feed can be a combination of social media messages and feed tracked updates. Social media messages include text created by a user, and may include other data as well. Examples of social media messages include posts, user status updates, and comments. Social media messages can be created for a user's profile or for a record. Posts can be created by various users, potentially any user, although some restrictions can be applied. As an example, posts can be made to a wall section of a user's profile page (which can include a number of recent posts) or a section of a record that includes multiple posts. The posts can be organized in chronological order when displayed in a GUI, for instance, on the user's profile page, as part of the user's profile feed. In contrast to a post, a user status update changes a status of a user and can be made by that user or an administrator. A record can also have a status, the update of which can be provided by an owner of the record or other users having suitable write access permissions to the record. The owner can be a single user, multiple users, or a group.

In some implementations, a comment can be made on any feed item. In some implementations, comments are organized as a list explicitly tied to a particular feed tracked update, post, or status update. In some implementations, comments may not be listed in the first layer (in a hierarchal sense) of feed items, but listed as a second layer branching from a particular first layer feed item.

A "feed tracked update," also referred to herein as a "feed update," is one type of information update and generally refers to data representing an event. A feed tracked update can include text generated by the database system in response to the event, to be provided as one or more feed items for possible inclusion in one or more feeds. In one implementation, the data can initially be stored, and then the database system can later use the data to create text for describing the event. Both the data and/or the text can be a feed tracked update, as used herein. In various implementations, an event can be an update of a record and/or can be triggered by a specific action by a user. Which actions trigger an event can be configurable. Which events have feed tracked updates created and which feed updates are sent to which users can also be configurable. Social media messages and other types of feed updates can be stored as a field or child object of the record. For example, the feed can be stored as a child object of the record.

A "group" is generally a collection of users. In some implementations, the group may be defined as users with a same or similar attribute, or by membership. In some implementations, a "group feed", also referred to herein as a "group news feed", includes one or more feed items about any user in the group. In some implementations, the group feed also includes information updates and other feed items that are about the group as a whole, the group's purpose, the group's description, and group records and other objects stored in association with the group. Threads of information updates including group record updates and social media messages, such as posts, comments, likes, etc., can define group conversations and change over time.

An "entity feed" or "record feed" generally refers to a feed of feed items about a particular record in the database. Such feed items can include feed tracked updates about changes to the record and posts made by users about the record. An entity feed can be composed of any type of feed item. Such a feed can be displayed on a page such as a web page associated with the record, e.g., a home page of the record. As used herein, a "profile feed" or "user's profile feed" generally refers to a feed of feed items about a particular user. In one example, the feed items for a profile feed include posts and comments that other users make about or send to the particular user, and status updates made by the particular user. Such a profile feed can be displayed on a page associated with the particular user. In another example, feed items in a profile feed could include posts made by the particular user and feed tracked updates initiated based on actions of the particular user.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of the implementations claimed.

It should be understood that some of the disclosed implementations can be embodied in the form of control logic using hardware and/or computer software in a modular or integrated manner. Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD); magneto-optical media; and hardware devices specially configured to store program instructions, such as read-only memory ("ROM") devices and random access memory ("RAM") devices. A computer-readable medium may be any combination of such storage devices.

Any of the operations and techniques described in this application may be implemented as software code to be executed by a processor using any suitable computer language such as, for example, Java, C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system or computing device may include a monitor, printer, or other suitable display for providing any of the results mentioned herein to a user. While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system comprising:
a processor; and
a memory storing instructions configurable to cause:
obtaining a plurality of documents for a web-based application, the web-based application comprising one or more of a plurality of components, the plurality of components comprising one or more custom components and one or more application programming interface (API) components;
processing a document object model (DOM) corresponding to the web-based application, wherein the one or more components of the web-based application are modeled in hierarchical form;
assigning each API component to a system mode setting configured to provide the API component access to the one or more components of the web-based application;
generating one or more secure documents for each custom component, each secure document comprising a key constituting an object reference of the custom component such that the custom component is accessible only to other custom components capable of providing the key in accordance with one or more rules of capability security; and
assigning each custom component to a user mode setting configured to provide the custom component access to another component of the web-based application for which the custom component can provide the key.

2. The system of claim 1, the instructions further configurable to cause:

for each custom component, restricting access to other custom components for which the custom component cannot provide the key.

3. The system of claim 1, the instructions further configurable to cause:
for each API component, determining whether the API component is a private API component or a public API component; and
for each custom component, restricting access to private API components.

4. The system of claim 3, wherein the user mode setting is further configured to provide custom components access to public API components.

5. The system of claim 1, the instructions further configurable to cause:
assigning a component to a security mode setting different from the system mode setting and the user mode setting.

6. The system of claim 5, wherein the security mode setting is configured to restrict access of the component to one or more other components different from the component.

7. The system of claim 5, wherein the security mode setting is configured to provide access of the component to one or more other components different from the component.

8. The system of claim 5, the instructions further configurable to cause:
providing keys for all custom components to all API components assigned to a system mode setting; and
determining, by an API component assigned to a system mode setting, that a custom component assigned to a user mode setting can provide the key to another custom component assigned to a user mode setting.

9. The system of claim 1, wherein upon generating the one or more secure documents for a custom component, access to one or more original documents associated with the custom component is prohibited to all components except for API components.

10. The system of claim 1, the instructions further configurable to cause:
generating a stamp associated with each custom component, wherein the stamp uniquely identifies a capability security mechanism associated with the custom component; and
determining, upon a component providing a key for another component, that the capability security mechanism of the other component is associated with the stamp for the other component.

11. A system comprising:
a database system implemented using a server system comprising one or more hardware processors, the database system configurable to cause:
obtaining a plurality of documents for a web-based application, the web-based application comprising one or more of a plurality of components, the plurality of components comprising one or more custom components and one or more application programming interface (API) components;
processing a document object model (DOM) corresponding to the web-based application, wherein the one or more components of the web-based application are modeled in hierarchical form;
assigning each API component to a system mode setting configured to provide the API component access to the one or more components of the web-based application;
generating one or more secure documents for each custom component, each secure document comprising a key constituting an object reference of the custom component such that the custom component is accessible only to other custom components capable of providing the key in accordance with one or more rules of capability security; and
assigning each custom component to a user mode setting configured to provide the custom component access to another component of the web-based application for which the custom component can provide the key.

12. The system of claim 11, the database system further configurable to cause:
for each custom component, restricting access to other custom components for which the custom component cannot provide the key.

13. The system of claim 11, the database system further configurable to cause:
for each API component, determining whether the API component is a private API component or a public API component; and
for each custom component, restricting access to private API components.

14. The system of claim 13, wherein the user mode setting is further configured to provide custom components access to public API components.

15. The system of claim 11, the database system further configurable to cause:
assigning a component to a security mode setting different from the system mode setting and the user mode setting.

16. The system of claim 11, the database system further configurable to cause:
providing keys for all custom components to all API components assigned to a system mode setting; and
determining, by an API component assigned to a system mode setting, that a custom component assigned to a user mode setting can provide the key to another custom component assigned to a user mode setting.

17. The system of claim 11, wherein upon generating the one or more secure documents for a custom component, access to one or more original documents associated with the custom component is prohibited to all components except for API components.

18. A computer program product comprising computer-readable program code capable of being executed by one or more processors when retrieved from a non-transitory computer-readable medium, the program code comprising instructions configurable to cause:
obtaining a plurality of documents for a web-based application, the web-based application comprising one or more of a plurality of components, the plurality of components comprising one or more custom components and one or more application programming interface (API) components;
processing a document object model (DOM) corresponding to the web-based application, wherein the one or more components of the web-based application are modeled in hierarchical form;
assigning each API component to a system mode setting configured to provide the API component access to the one or more components of the web-based application;
generating one or more secure documents for each custom component, each secure document comprising a key constituting an object reference of the custom component such that the custom component is accessible only to other custom components capable of providing the key in accordance with one or more rules of capability security; and assigning each custom component to a user mode setting configured to provide the custom component access to another component of the web-based application for which the custom component can provide the key.

19. The computer program product of claim 18, the instructions further configurable to cause:

for each custom component, restricting access to other custom components for which the custom component cannot provide the key.

20. The computer program product of claim 18, the instructions further configurable to cause:

for each API component, determining whether the API component is a private API component or a public API component; and for each custom component, restricting access to private API components.

* * * * *